April 12, 1938. H. FÖTTINGER 2,114,179
POWER TRANSMISSION DEVICE
Filed Oct. 1, 1936
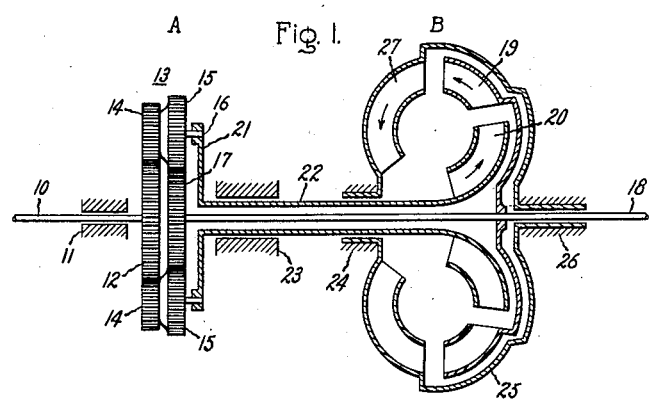
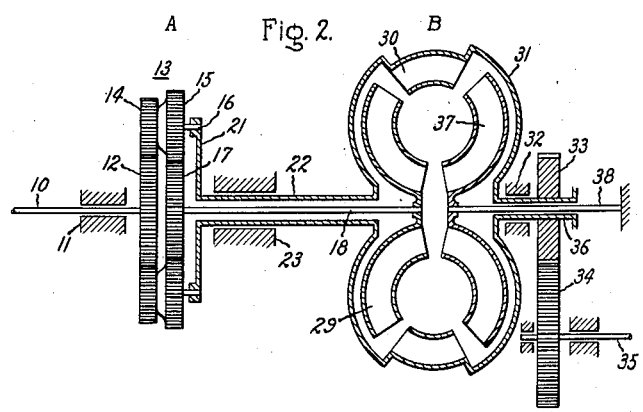
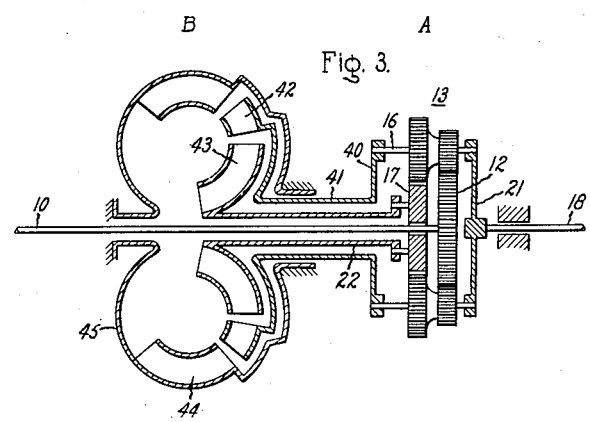
Inventor:
Hermann Föttinger,
by Harry E. Dunham
His Attorney.

Patented Apr. 12, 1938

2,114,179

UNITED STATES PATENT OFFICE 2,114,179

POWER TRANSMISSION DEVICE

Hermann Föttinger, Berlin-Charlottenburg, Germany

Application October 1, 1936, Serial No. 103,600
In Germany October 11, 1935

2 Claims. (Cl. 74—293)

My invention relates to power transmission devices, and more particularly to a device comprising a hydraulic power transmitting gear having its elements connected to the elements of a mechanical gear train.

An object of my invention is to provide an improved gear train which may be readily connected to the elements of a hydraulic power transmission device.

Another object of my invention is to provide an improved mechanical and hydraulic transmission wherein the hydraulic transmission is developed as a single stage device.

For a better understanding of my invention, together with other and further objects thereof, reference is had to the following description, taken in connection with the accompanying drawing, and its scope will be pointed out in the appended claims.

Referring to the drawing, Fig. 1 illustrates a vertical cross-section of a power transmission built in accordance with my invention, and Figs. 2 and 3 are vertical cross-sectional views of modifications thereof.

Referring to Fig. 1 in detail, I have illustrated a power transmission device comprising a gear train A and a hydraulic device B. The gear train A is an improved form of an epicyclic train whereby power from a drive member is divided and transmitted to a driven member through two channels, one channel being a direct mechanical connection and the other channel being through the hydraulic device B. The drive member, shaft 10, of this transmission is mounted in a suitable bearing 11 and is connected to a sun gear 12 of the gear train A. Engaging the gear 12 are several pinions 13, each of which comprises two planet gears 14 and 15, of different diameters, rigidly connected to each other on a common shaft 16. The gears 15 of the pinions 13 engage a second sun gear 17 mounted on a shaft 18 which, in the present case, is the driven member. The driven shaft 18 is in axial alinement with the drive shaft 10 and the gears 12 and 17 are parallel to each other, being connected only through the pinions 13. This gear train, comprising gears 12 and 17 connected by the pinions 13, of which the gears 14 engage the gear 12 and gears 15 engage the gear 17, comprises an improved epicyclic gear train in which the gears 15 and 17 take the place of the usual internal gear provided in the standard and well-known epicyclic gear train.

The above-described improved gear train constitutes a simplified gearing for connection to or operation with the hydraulic device B. The hydraulic device B is a power transmitting device capable of being used as a slip coupling or as a speed reducing device. It comprises a casing in which a fluid is set into motion by a wheel having properly shaped vanes thereon. The energy imparted to this fluid is absorbed by a second wheel also having vanes thereon and is thereby caused to rotate. In order to facilitate the flow of fluid between the two wheels, which may be termed the pump and turbine wheels respectively, a third wheel or set of vanes may be used. This third set of vanes is usually stationary and is for convenience attached to the casing of the device. Further details of this type of hydraulic coupling and speed reducing device are set forth in my U. S. Patents No. 1,199,359 and 1,199,360, issued September 26, 1916.

In the device illustrated in Fig. 1 the driven shaft 18 has mounted upon it the turbine wheel 19 of the hydraulic device B and the pinion shafts 16 are connected to the pump wheel 20 of the same device through a disc or spider 21 mounted upon a hollow shaft 22 which is concentric with the driven shaft 18 and is mounted in bearings 23 and 24. The turbine and pump wheels 19 and 20 are provided with vanes for circulating the fluid provided in the casing 25 in the direction indicated by the arrows. The casing 25 is stationary. It supports the bearings 24 and 26, and further supports a group of directing vanes 27 which receive the circulating fluid from the turbine wheel 19 and redirect it to the pump wheel 20. With this arrangement it will be evident that power is transmitted to the shaft 18 from the shaft 10 through the pinions 13. If these pinions are stationary upon their own shafts 16 a direct transmission of power takes place between the shafts 10 and 18, their respective speeds of rotation being equal, but a rotation of these pinions about their axes and the resultant relative movement between the hollow shaft 22 and the driven shaft 18 changes this direct transmission, by creating a speed difference between the two shafts in proportion to the movement of the pinions about the axis of shaft 18. The speed ratio between the two shafts 10 and 18 is of course controlled by the hydraulic transmission device and is proportional to the load transmitted from the drive shaft to the driven shaft. In the present arrangement of the gear transmission the connection between the elements of the gear train and the hydraulic coupling are simplified and thereby only a single stage hydraulic coupling is necessary.

In Fig. 2 I have illustrated a modification of my invention wherein the sun gear 17 is connected to the pump wheel 29 of the hydraulic device instead of being connected to the turbine wheel 19 as shown in Fig. 1. The hollow shaft 22, on the other hand, driven by the pinions 13, is connected to the turbine wheel 30 of the device. In this modification the turbine wheel 30 is mounted upon the casing 31 of the device which is rotatably mounted in bearing 32 and transmits power through a pair of gears 33 and 34 to a shaft 35. The gear 33 is mounted on a sleeve 36 attached to the casing 31 and comprises the driven member of this transmission. The directing vanes for directing the fluid between the pump wheel 29 and the turbine wheel 30 are mounted upon a wheel 37 which is in turn mounted upon a shaft 38. The shaft 38 is itself mounted rigidly and projects through the sleeve 36 and the center of gear 33 into the casing 31. In this modification the shaft 38 provides a convenient means for supporting the stationary wheel 37 and the gears 33 and 34 are therefore necessary to transmit power to an output shaft 35.

In Fig. 3 I have illustrated another modification in which the position of the hydraulic device B and the gear train A is reversed, so that the hydraulic gear is now on the driven side of the transmission. The drive shaft 10 in this modification projects through the hydraulic device B and is connected to the gear 12 of the gear transmission as in the previous modifications. The driven shaft 18 in this modification is connected to the spider 21 carrying the pinions 13. The pinion shafts 16 in this case project through the pinions and engage a spider 40 which is connected to a hollow shaft 41 concentric with the drive shaft 10 and the hollow shaft 22 and carries the turbine wheel 42 of the hydraulic device B. The gear 17 in this modification is connected to the hollow shaft 22 which carries the pump wheel 43 corresponding to the wheel 20 in Fig. 1. The directing vanes 44 are connected to the stationary casing 45.

What I claim as new and desire to secure by Letters Patent of the United States, is:

1. In a power transmission device, the combination of a hydraulic coupling including a pump wheel, a turbine wheel and a set of stationary vanes, and a gear train comprising a pair of sun gears, a drive shaft connected to one of said sun gears, a plurality of pinions each comprising two planet gears engaging respectively said sun gears, a driven shaft attached to said second sun gear and arranged to be driven by said turbine wheel, and means for connecting said pinions to said pump wheel whereby the movement of said pinions about the axis of said sun gears is transmitted to said pump wheel.

2. In a power transmission device, the combination of a hydraulic coupling including a casing, a fluid therein, a pump wheel, a turbine wheel and a set of stationary directing vanes arranged between said turbine and pump wheels, a gear train comprising a pair of sun gears arranged about a common axis and parallel to each other; a plurality of pinions each comprising planet gears connected to each other and engaging said sun gears respectively, a drive shaft attached to one of said sun gears, a driven shaft attached to said second sun gear, and a third shaft attached to said pinions, and means whereby relative rotation between said driven shaft and said third shaft is regulated by said hydraulic device comprising a connection between said pump wheel and said third shaft and a connection between said turbine wheel and said driven shaft.

HERMANN FOTTINGER.